United States Patent [19]

Chato et al.

[11] 4,316,233

[45] Feb. 16, 1982

[54] SINGLE PHASE ELECTROHYDRODYNAMIC PUMP

[76] Inventors: John C. Chato, 714 W. Vermont Ave., Urbana, Ill. 61801; Joseph M. Crowley, 506 S. Elm St., Champaign, Ill. 61820

[21] Appl. No.: 116,498

[22] Filed: Jan. 29, 1980

[51] Int. Cl.$^3$ ............................................. B05B 5/02
[52] U.S. Cl. ...................................... 361/233; 417/48
[58] Field of Search .................. 361/233, 227, 228; 417/48, 49; 310/308, 309

[56] References Cited

U.S. PATENT DOCUMENTS

| | | | |
|---|---|---|---|
| 3,325,709 | 6/1967 | Anderson | 361/233 |
| 3,463,944 | 8/1969 | Melcher | 310/309 |
| 3,778,678 | 12/1973 | Masuda | 361/233 |
| 3,801,869 | 4/1974 | Masuda | 361/233 X |

*Primary Examiner*—Harry E. Moose, Jr.

[57] ABSTRACT

Apparatus for pumping charged fluid or charged particles by means of a travelling electric field which acts on the charge through Coulombic forces. The electric field is produced by a single phase time varying voltage applied to material with dimensions or electrical properties which vary in space. This material is placed between the medium to be pumped and an electrical conductor attached to the voltage supply.

8 Claims, 8 Drawing Figures

SINGLE PHASE ELECTROHYDRODYNAMIC PUMP

FIELD OF INVENTION

The present invention relates to pumps. More specifically, it pertains to efficient pumps having no moving parts, and which utilize alternating electric fields to propel material in a desired direction.

DISCUSSION OF PRIOR ART

Many mechanical pumps have been developed to move fluids through pipes. In general, these pumps raise the pressure at the inlet of the pipe to a value large enough overcome the viscous losses entailed in moving the fluid through the pipe at the desired flow rate. As a consequence of this approach, the static pressure at the inlet region of the pipe is larger than that at the exit.

In many pumping applications, this excess pressure is a distinct drawback. In the pipes which contain underground electric power cables, for example, it may be necessary to circulate insulating oil through the pipe to cool the cables. In order to prevent electrical breakdown, this oil must be kept under a minimum pressure, and the excess pressure implied by mechanical pumping through a long pipe can raise the total pressure above the rating of the pipe, leading to leaking of the oil or rupture of the pipe.

One way to avoid this pressure buildup is to use an electrohydrodynamic pump instead of a mechanical pump. An electrohydrodynamic pump applies electrostatic forces to charges inside the medium to be pumped, so as to pull or push the charges (and attached medium) in the direction of the electric field. Since the electric force acts directly on the fluid, there is no need to build up a large pressure, and the problems associated with pressure buildup in a long pipe can be avoided.

In the prior art (see for example U.S. Pat. Nos. 3,463,944 or 3,778,678), insulating fluids or charged particles have been propelled by alternating electric fields whose principal component is a travelling wave which acts either to attract the material in the direction of travel, or to repel the material in the opposite direction. In these pumps, the travelling wave was provided by multiple electrodes connected to an alternating voltage source providing at least three phases. In many applications, such as the pumping of fluid through long pipes, the multiple electrodes and phases require a complicated and expensive structure which precludes the use of electrohydrodynamic pumping.

These structures could be considerably simplified if only a single conductor were needed to excite the electrohydrodynamic pump, but in the prior art, a single phase conductor could not be made to pump reliably, since the flow might start in either direction, and might also flow in circular patterns rather than in the desired direction when the pump is started.

OBJECTS OF THE INVENTION

Accordingly, the principal object of this invention is to provide a pump for insulating fluids or charged particles which requires only a single continuous electrode driven by a single phase voltage supply.

Another object of this invention is to create a travelling electrostatic wave using only a single phase voltage supply.

A further object of our invention is provide a self-starting electrohydrodynamic pump.

Yet another object of our invention is to provide a pump having no moving parts, which is suitable for pumping insulating fluids or charged particles through long pipes without increasing the pressure within said pipes.

These and other objects will become evident in the description to follow and will be particularly pointed out in the appended claims.

GENERAL DESCRIPTION OF THE OPERATION

Broadly, and by way of summary, the invention relates to an apparatus adapted to effect pumping of a charged fluid or charged particles by means of the attractive or repulsive forces exerted on the charges by an electric field. These forces are due to solely to the Coulombic interaction, and are not related to the forces developed on moving charges or currents in a magnetic field (the dynamoelectric force). In addition, the electric forces act directly on the material, and not through the intermediary of mechanical pressure, so that the static pressure inside the container need not be increased as a result of the pumping.

According to the present invention, the desired objects can be accomplished by surrounding a single electrically conducting electrode with a semi-insulating material in which the electrical properties or geometrical dimensions vary in the direction of desired motion. This variation is arranged so that when a voltage is first applied to the electrode, the electric potential at the surface of the semi-insulating coating will start to rise in response to the applied excitation. Since the electrical properties or dimensions vary throughout the coating, however, the rise at the surface will not be uniformly fast. The regions which have a relatively short electrical relaxation time will exhibit the fastest rise, so that the potential there will approach its peak faster. Later, the regions with intermediate electrical relaxation times will exhibit voltages near the peak, and finally those regions with the longest relaxation times will begin to approach the peak.

If the various regions of the coating are arranged so that the electrical relaxation times of the material go from the shortest to the longest value sequentially along the surface of the coating in some section then the potential at the surface will appear to move along like a wave as the applied voltage is alternately increased and decreased. If there are electric charges present in the adjacent medium, either as charged particles or as space charge inside a fluid, these charges will be acted on by the Coulomb force of the electrostatic field, and caused to move either in the direction of the variation of the electrical relaxation time of the material or in the opposite direction, according to the sign of the charge. The sections may be repeated indefinitely, if desired, to extend the pumping action. This is especially advantageous when pumping in a long pipe without pressure increases.

FIGURES

In order to facilitate the description and understanding of this invention, reference is made to the appended drawings, in which.

DESCRIPTION AND OPERATION

Figure 1:
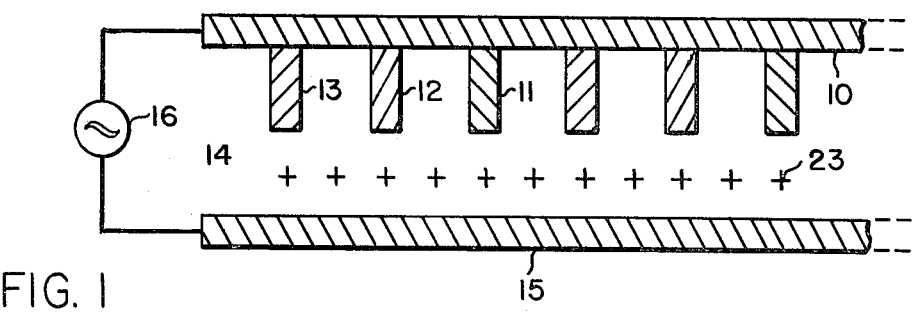
FIG. 1 is a drawing of one particular embodiment, in which the travelling wave is produced by the variation in electrical conductivity of neighboring projections from the conductor.

Turning now to FIG. 1, we discuss a particular embodiment of the invention which is most suitable for an explanation of those features of the present invention which are responsible for the production of the travelling wave. The invention, shown in a cross sectional view along the direction of intended motion, includes an elongated conductor #10 attached to a source of single phase, time varying voltage #16. Along the conductor #10 are spaced projections composed of semi-insulating material #11-13. These projections are of at least three different types of material with differing electrical conductivity so that the electric relaxation time of projection #11 is faster than the electrical relaxation time of projection #12 which in turn is faster than that of projection #13. The conductor #10 and the projections #11-13 are in contact with the insulating medium #14 which is to be pumped. Some distance away from the projections is a ground electrode #15 which is attached to the opposite polarity of the voltage source #16.

By way of example of the operation of the pump shown in FIG. 1, we can assume that a sinusoidal voltage is supplied by the source #16 to the conductor #10. Since the medium to be pumped is not a perfect conductor, the voltage at the tip of the projections would eventually approach some fraction of the voltage applied by the source #16 to the conductor #10. Due to the finite relaxation time of the semi-insulating material, however, the approach to the full voltage is delayed by an amount which depends on the electrical relaxation time of the projections and the medium.

Figure 2:
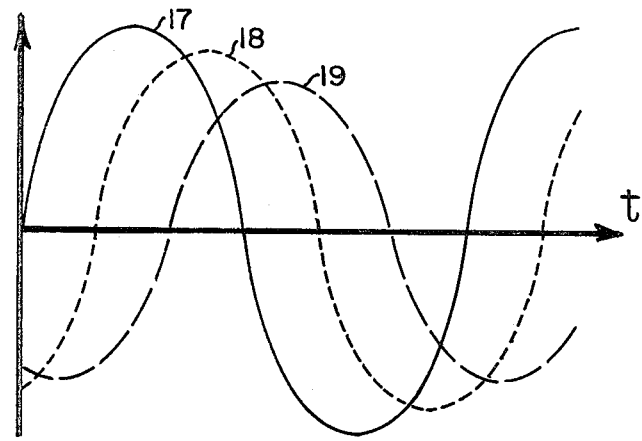
FIG. 2 is a representation of the voltages appearing at the ends of the projections of FIG. 1 in response to a sinusoidal voltage applied to the conductor.

For the particular choice of relaxation times associated with FIG. 1, the voltages at the tip of projections #11-13 are shown in FIG. 2. Since the material of projection #11 has the shortest electrical relaxation time, the voltage #17 at its tip approaches the applied voltage quickly, and this voltage is very similar to the applied voltage in magnitude and phase. Turning to projection #12 which has an longer relaxation time, we find that the voltage #18 at its tip lags the applied sinusoidal voltage, and is usually reduced in amplitude. For projection #13 which has the longest electrical relaxation time, the voltage #19 lags even farther behind the applied voltage, and has the smallest amplitude.

Figure 3:
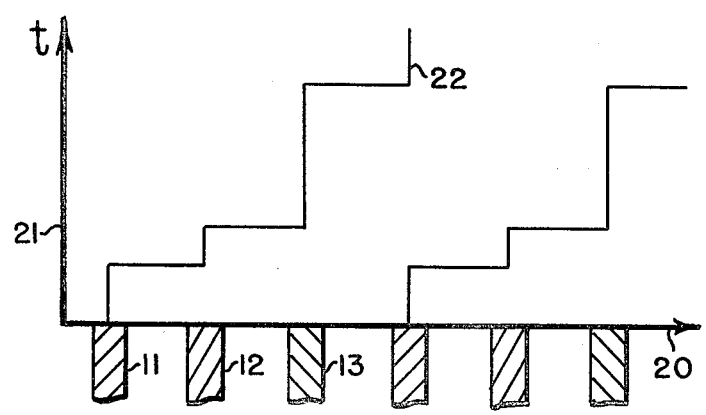
FIG. 3 is a plot of the position of the peak of the electric potential wave produced by the structure of FIG. 1.

The effect of these time lags on the positions of maximum voltage applied to the medium to be pumped is indicated in FIG. 3. This figure shows the projections #11-13 distributed along the x-axis #20. The vertical axis #21 represents time. When the peak value of the electric potential within one section of the structure occurs at a certain projection, that section is indicated in the graph by a solid line #22 drawn above that section. The figure shows that the position of this peak appears to move along the structure in the x-direction corresponding to a travelling wave of electric potential. The voltages at the tips of the projections cause an electric field inside the medium #14 which is to be pumped, and this electric field acts on the charges #23 inside the medium, thus pumping them in the desired direction.

Figure 4:
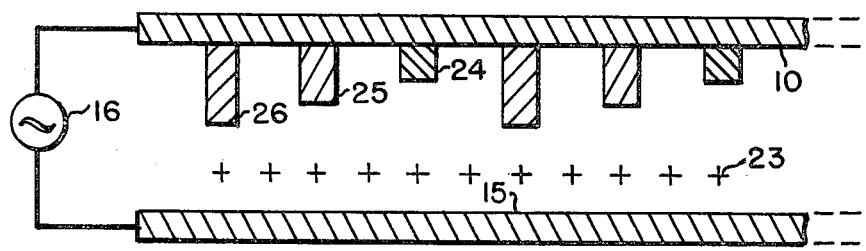
FIG. 4 is a sketch of an embodiment in which the travelling wave is induced by variation of the length of the projection.

Although the time lags needed to produce the travelling wave were provided by variations in the electrical conductivity of the various projections in the above embodiment, they can also be provided by variations in the physical dimensions of the projections, as shown in FIG. 4. Here, the pump apparatus consists of a conductor #10 connected to a time-varying voltage source #16, as in the embodiment of FIG. 1. In the present case, however, the projections are all made of the same material, so that all projections have the same electrical conductivity. The various projections have different dimensions, however, so that projection #24 is substantially shorter than projection #25 which is in turn substantially shorter than projection #26. When voltage is applied to the conductor #10 the voltages at the tips of the projections will all rise toward the applied voltage, but at different rates, due to the differences in geometry. Thus, the voltage at the tip of the shortest projection, #24 will quickly approach the applied voltage, since its total resistance is least, and also because the separation from the ground electrode #15 is greatest so that the capacitance there is least. At the intermediate projection #25 the voltage at the tip will lag somewhat, due to the increased resistance associated with the extra length. Finally, the voltage at the tip of the longest projection #26 will exhibit the greatest lag, due to the large resistance associated with the long length. Thus this structure will also produce a travelling wave of electric potential at the outer surfaces of the projections, just as in the previous embodiment, and this wave will have the same effect, namely, the pumping of the insulating medium and the associated charges.

Figure 5:
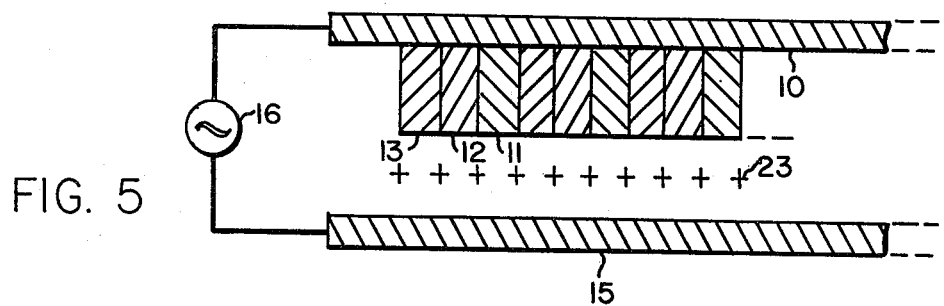
FIG. 5 is a sketch of an embodiment in which the various projections are in contact with each other.

The previous figures have shown the pump as composed of a series of discrete projections from the conductor. This was done primarily to aid in the description of the operation of the invention, and is not necessary for its successful application. For example, the semi-insulating projections introduced in FIG. 1 can be made contiguous, as shown in FIG. 5.

Figure 6:
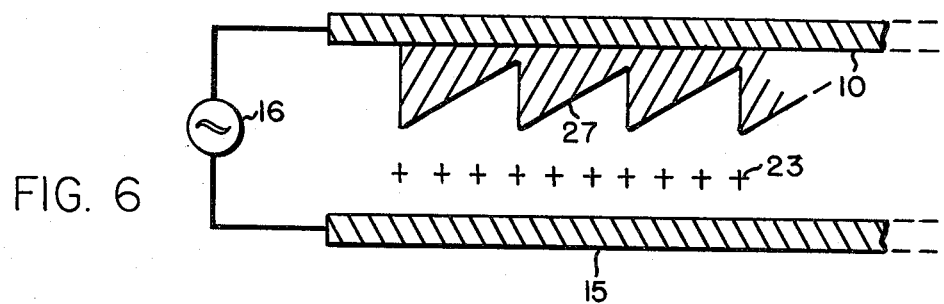
FIG. 6 is a sketch of an embodiment in which there is a continuous variation in the thickness of the covering arranged so as to produce a travelling wave.

Also, more than three different materials or lengths can be used in each section, or the material can show a continuous variation of electrical properties or dimensions throughout the section. This last possibility is shown in FIG. 6, in which a semi-insulating material #27 of varying thickness is applied to the conductor #10. If the thickness increases gradually throughout most of the section, followed by a more rapid decrease, a travelling wave of electric potential will still be produced at the surface of the semi-insulator, and the pump will operate as before.

Figure 7:
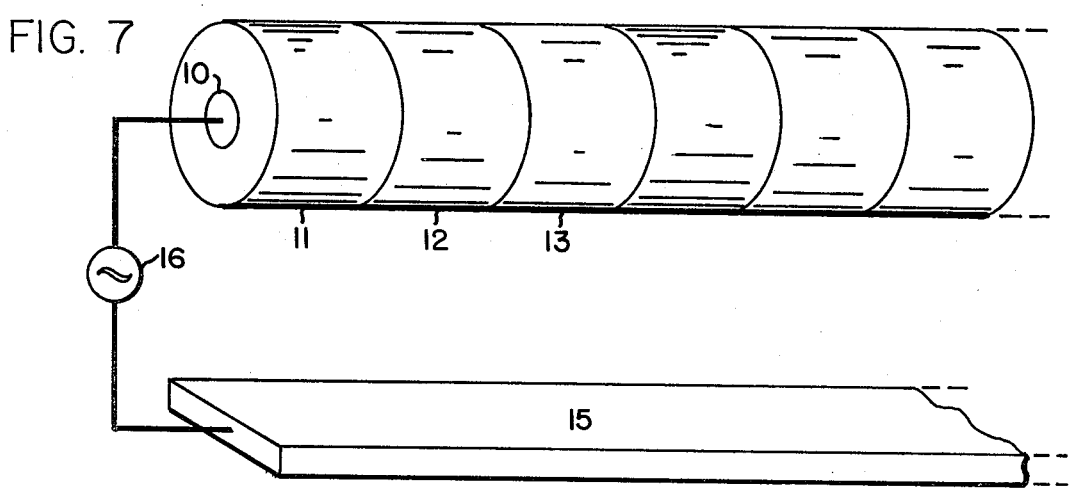
FIG. 7 is a sketch of an embodiment in which the electrical conductor is a wire and the travelling wave is produced by a structure attached to the surface of the wire.

Likewise, the pump will operate as before in any geometrical arrangement which includes a good conductor in contact with the proper semi-insulating materials adjacent to the medium to be pumped. For instance, the conductor could be a wire, as in FIG. 7. In this figure, the conductor #10 is surrounded by a semi-insulating coating which has three different materials #11-13 in a section of the covering, and this section may be repeated along the length of the wire.

Figure 8:
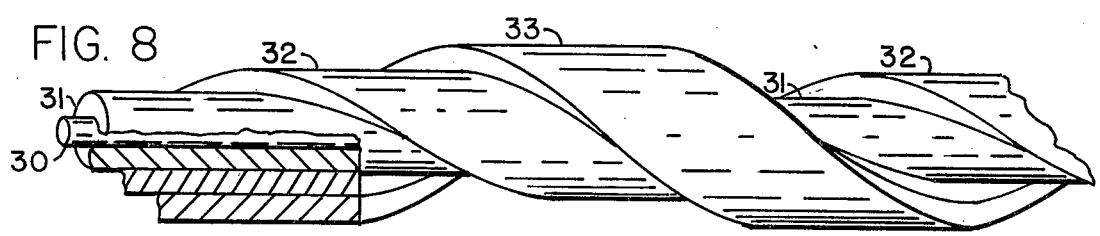
FIG. 8 depicts an embodiment in which the different thicknesses are produced by wrapping a central conductor spirally with material so as to produce an appropriate variation in thickness.

In another variation on the basic pumping apparatus, the change in electrical properties in the desired direction of pumping can be achieved by successive wrapping of the conductor, as shown in FIG. 8. This figure again shows a pumping structure arranged around a central wire #30 which is first entirely surrounded by a semi-insulating coating #31. This structure is then wrapped with a tape of semi-insulating material #32 so as to leave a spiral strip of the first coating #31 uncovered. Lastly, a second semi-insulating tape #33 is wrapped around the structure so as to partially cover the first tape #32 leaving one side of the first tape exposed. This procedure yields a structure similar to that of FIG. 4 in which a travelling wave is produced by variations in thickness of the semi-insulating covering. In this case the wave will travel spirally down the structure, so that there will be a component which pumps axially, and a second component which pumps azimuthally, which may be advantageous in some applications. All of these structures can be extended by repetition of the basic sectional unit, so as to pump fluid through long pipes. Since the force is applied directly to the fluid, this extension will not imply a large pressure head.

This invention has been disclosed in connection with a constant direction of pumping, but other directions may be used as well. For example, the method disclosed may be used to circulate materials to aid in mixing or heat transfer, and the semi-insulating sections could then be arranged in a circle along some plane in the container.

Also, the sinusoidal voltage source could be replaced with other time varying sources which might be more convenient in a particular application. A square wave of voltage, for example, is simpler to generate than a sine wave, and might be used in applications which can not make use of a convenient source of AC power.

These and other modifications of the invention will occur to those skilled in the art and all such modifications are considered to be within the spirit and scope of the invention as defined in the appended claims.

What is claimed is:

1. An apparatus for inducing pumping of a charged medium, said apparatus consisting of an electrically conducting electrode connected to a souce of varying voltage, and separated at least partially from said medium by a non-uniform semi-insulating covering arranged so that the electrical relaxation time of said covering increases from lower to higher values over some finite section of said covering in such a way as to set up a travelling electric field which exerts a Coulombic force on said medium.

2. An apparatus as in claim 1 and in which said covering is arranged along the outer surface of said conducting electrode.

3. An apparatus as in claim 1 and in which said covering is arranged along the inner surface of said conducting electrode.

4. An apparatus as in claim 1 and in which said medium is charged by the action of said travelling electric field.

5. An apparatus as in claim 1 and in which said medium is charged by charges injected into said medium by external generation.

6. An apparatus as in claim 1 and in which said variation in electrical relaxation time is produced by means of geometrical variation of thickness of the said covering.

7. An apparatus as in claim 1 and in which said variation in electrical relaxation time is produced by means of variation in the electrical conductivity of the said covering.

8. An apparatus as in claim 1 and in which said electrode is a wire introduced into a pipe.

* * * * *